United States Patent
Wu et al.

(10) Patent No.: US 9,769,893 B1
(45) Date of Patent: Sep. 19, 2017

(54) LIGHT-EMITTING DEVICE AND CONTROL METHOD THEREOF

(71) Applicant: APACER TECHNOLOGY INC., New Taipei (TW)

(72) Inventors: Chun-Chieh Wu, New Taipei (TW); Wei-Te Cheng, New Taipei (TW); Po-Jung Liu, New Taipei (TW)

(73) Assignee: APACER TECHNOLOGY INC., New Taipei (TW)

( * ) Notice: Subject to any disclaimer, the term of this patent is extended or adjusted under 35 U.S.C. 154(b) by 0 days.

(21) Appl. No.: 15/214,275

(22) Filed: Jul. 19, 2016

(30) Foreign Application Priority Data

May 30, 2016 (TW) .............................. 105116917 A

(51) Int. Cl.
*H05B 37/02* (2006.01)
*H05B 33/08* (2006.01)
*H05K 7/02* (2006.01)
*G05B 15/02* (2006.01)

(52) U.S. Cl.
CPC ......... *H05B 33/0842* (2013.01); *G05B 15/02* (2013.01); *H05B 37/0254* (2013.01); *H05B 37/0272* (2013.01); *H05K 7/02* (2013.01)

(58) Field of Classification Search
CPC . H05B 37/0254; H05B 37/0272; H05B 37/03
USPC .................................................. 315/307, 312
See application file for complete search history.

(56) References Cited

U.S. PATENT DOCUMENTS

| 2002/0195975 | A1* | 12/2002 | Schanberger | G09G 3/14 315/291 |
| 2015/0264779 | A1* | 9/2015 | Olsen | F21S 10/023 315/294 |
| 2016/0123564 | A1* | 5/2016 | Quilici | H05B 37/0245 362/233 |
| 2016/0148558 | A1* | 5/2016 | Ernst | G06F 1/1694 345/156 |
| 2017/0104532 | A1* | 4/2017 | Stout | H04B 10/116 |

FOREIGN PATENT DOCUMENTS

| TW | M304853 U | 1/2007 |
| TW | M456042 U | 6/2013 |
| TW | M467098 U | 12/2013 |
| TW | 201521346 A | 6/2015 |

* cited by examiner

*Primary Examiner* — Tung X Le
(74) *Attorney, Agent, or Firm* — Kirton McConkie; Evan R. Witt

(57) ABSTRACT

A light-emitting device and a control method are provided. The light-emitting device is applied to a memory module. The light-emitting device includes at least one memory module board, at least one light-emitting board and an application program unit. The at least one memory module board is connected with a host. Each light-emitting board includes plural light-emitting units and a control unit. The control unit controls a lighting mode of the plural light-emitting units. The control unit is electrically connected with the host through the corresponding memory module board. The application program unit generates a control signal. The control signal is transmitted to the control unit of each light-emitting board through the host. The control unit controls the corresponding light-emitting units according to the control signal.

7 Claims, 5 Drawing Sheets

LIGHT-EMITTING DEVICE AND CONTROL METHOD THEREOF

FIELD OF THE INVENTION

The present invention relates to a light-emitting device, and more particularly to a light-emitting device for a memory module and a method of controlling the light-emitting device to generate different light patterns.

BACKGROUND OF THE INVENTION

A dynamic random access memory (DRAM) is one of the semiconductor memories for storing data of a computer. When the supplied power is turned off, the data in the DRAM loses quickly. That is, DRAM is a volatile memory. Generally, the amount of data to be stored in the computer is dependent on the capability of the DRAM in the computer.

As the DRAM fabricating technology is well established, the manufacturers make efforts in changing the appearance of the DRAMs in order to appeal to the consumers. In accordance with an approach of changing the appearance, a light-emitting diode (LED) is mounted on a printed circuit board (PCB) for the DRAM, and the light-emitting diode emits a light beam to appeal to the consumers. Conventionally, two methods are widely used for allowing the light-emitting diode to emit the light beam.

The first method uses a hardware component to control the light-emitting diode to emit the light beam. For example, an oscillator, a capacitor and any other appropriate component are added to the hardware traces to emit the light beam. However, the method can only provide the flickering effect such as the flicking effect of the breathing light.

Another method adjusts the flickering speed in different flickering modes according to the result of detecting the data flow of the memory. Since only a small number of flickering modes are provided, the conventional method cannot provide diverse flickering modes to meet the requirements of the consumers.

Moreover, for performing the above methods, the controller of the DRAM has to control the flickering mode of the LED in a multiplexing manner. Consequently, the efficiency of the controller to access the dies of the DRAM is adversely affected.

SUMMARY OF THE INVENTION

An object of the present invention provides a light-emitting device and a control method of the light-emitting device in order to overcome the drawbacks of the conventional technologies.

In accordance with an aspect of the present invention, there is provided a light-emitting device for a memory module. The light-emitting device includes at least one memory module board, at least one light-emitting board and an application program unit. The at least one memory module board is connected with a host. Each light-emitting board includes plural light-emitting units and a control unit. The control unit controls a lighting mode of the plural light-emitting units. The control unit is electrically connected with the host through the corresponding memory module board. The application program unit generates a control signal. The control signal is transmitted to the control unit of each light-emitting board through the host. The control unit controls the corresponding light-emitting units according to the control signal.

In an embodiment, each memory module board is connected with the corresponding control unit through a cable, and the memory module board transmits electric power to the corresponding control unit and the corresponding light-emitting units and transmits the control signal to the corresponding control unit through the cable.

In an embodiment, the control unit is a microcontroller unit, and the light-emitting units are light-emitting diodes.

In an embodiment, each light-emitting board is fixed on the corresponding memory module board.

In accordance with another aspect of the present invention, there is provided a control method for a light-emitting device. The light-emitting device is applied to a memory module. The light-emitting device includes at least one memory module board, at least one light-emitting board and an application program unit. The at least one light-emitting board is fixed on the corresponding memory module board. The control method includes the following steps. Firstly, the at least one memory module board is connected with a host. Then, the application program unit is executed to generate a control signal, and the control signal is transmitted to the at least one memory module board through a system management bus. Then, the control signal is transmitted from the at least one memory module to a control unit of the corresponding light-emitting board. Then, a lighting mode of plural light-emitting units of the corresponding light-emitting board is controlled according to the control signal.

In an embodiment, each memory module board is connected with the corresponding control unit through a cable, and the memory module board transmits electric power to the corresponding control unit and the corresponding light-emitting units and transmits the control signal to the corresponding control unit through the cable.

In an embodiment, the control unit is a microcontroller unit, and the light-emitting units are light-emitting diodes.

In an embodiment, the control method further includes steps of generating the control signal according to a result of detecting a data flow of the memory module and controlling the plural light-emitting units according to the control signal, so that the lighting mode corresponding to the data flow of the memory module is displayed.

From the above descriptions, the light-emitting device and the control method of the present invention have some advantages. Firstly, the control unit and the light-emitting units are independently disposed on the light-emitting board. Consequently, the controller of the DRAM does not need to control the flickering mode of the LED in a multiplexing manner. Secondly; the application program unit can be executed to control the lighting modes of the plural light-emitting units on the at least one light-emitting board. Consequently, the purposes of emitting the flickering light in diverse manner can be achieved.

The above contents of the present invention will become more readily apparent to those ordinarily skilled in the art after reviewing the following detailed description and accompanying drawings, in which:

DETAILED DESCRIPTION OF THE PREFERRED EMBODIMENT

Figure 1:
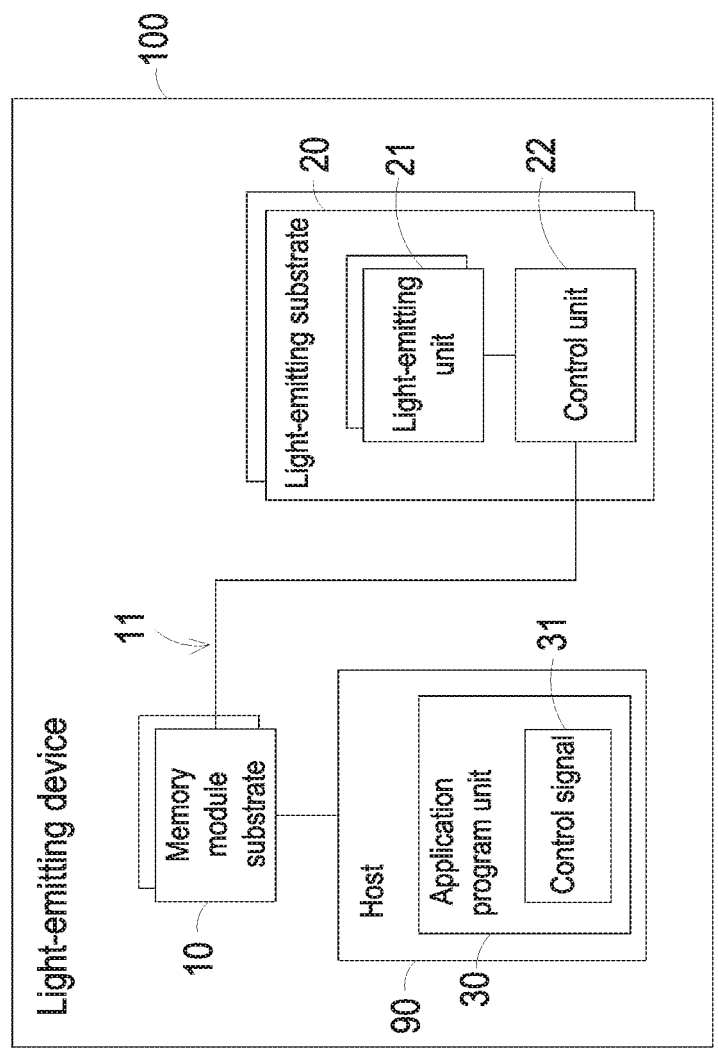
FIG. 1 is a schematic functional block diagram illustrating a light-emitting device according to an embodiment of the present invention.

FIG. 1 is a schematic functional block diagram illustrating a light-emitting device according to an embodiment of the present invention. The light-emitting device 100 is applied to a memory module. As shown in FIG. 1, the light-emitting device 100 comprises at least one memory module board 10, at least one light-emitting board 20 and an application program unit 30. The memory module board 10 is a printed circuit board (PCB) for a memory module. The light-emitting board 20 is a printed circuit board (PCB) corresponding to the memory module board 10. The application program unit 30 is a software application program unit in a computer host or a network application program unit in a mobile device.

In this embodiment, a host 90 is a computer motherboard with plural memory module slots. The at least one memory module board 10 is installed on the host 90 through the corresponding memory module slot.

Each light-emitting board 20 comprises plural light-emitting units 21 and a control unit 22. In an embodiment, the control unit 22 is a microcontroller unit (MCU), and the light-emitting units 21 are light-emitting diodes (LED). The control unit 22 can control a lighting mode of each light-emitting unit 21. For example, the lighting mode of the light-emitting unit 21 includes the light color, the light-emitting frequency and the light luminance.

According to a demand of the user, the application program unit 30 generates a control signal 31. The control signal 31 is transmitted to the control unit 22 of each light-emitting board 20 through the host 90. According to the control signal 31, the control unit 22 controls the lighting mode of the corresponding light-emitting unit 21.

In an embodiment, the application program unit 30 is stored in a hard disk of the host 90. When the application program unit 30 is executed, a user interface is shown on a display screen. By operating the user interface, a predetermined control signal 31 is generated. It is noted that the medium of storing the application program unit 30 is not restricted. In some other embodiments, the application program unit 30 is stored in another electronic device such as a smart phone, a tablet computer, a notebook computer or a workstation. After the control signal 31 is generated, the control signal 31 is transmitted from the electronic device to the host 90.

Moreover, the electric power and the command for accessing the data of the memory dies can be transmitted from the host 90 through gold fingers of the memory module. In this embodiment, each memory module board 10 of the memory module is further equipped with a cable 11. The memory module board 10 is electrically connected with the control unit 22 of the corresponding light-emitting board 20 through the cable 11. That is, the control unit 22 is connected with the gold fingers of the corresponding memory module board 10 through the cable 11 and electrically connected with the host 90. Consequently, through the cable 11, the electric power can be transmitted to the control unit 22 and the light-emitting units 21, and the control signal 31 can be transmitted to the control unit 22. The control signal 31 is not transferred through the controller (not shown) of the memory module but directly transmitted to the control unit 22.

Figure 2:
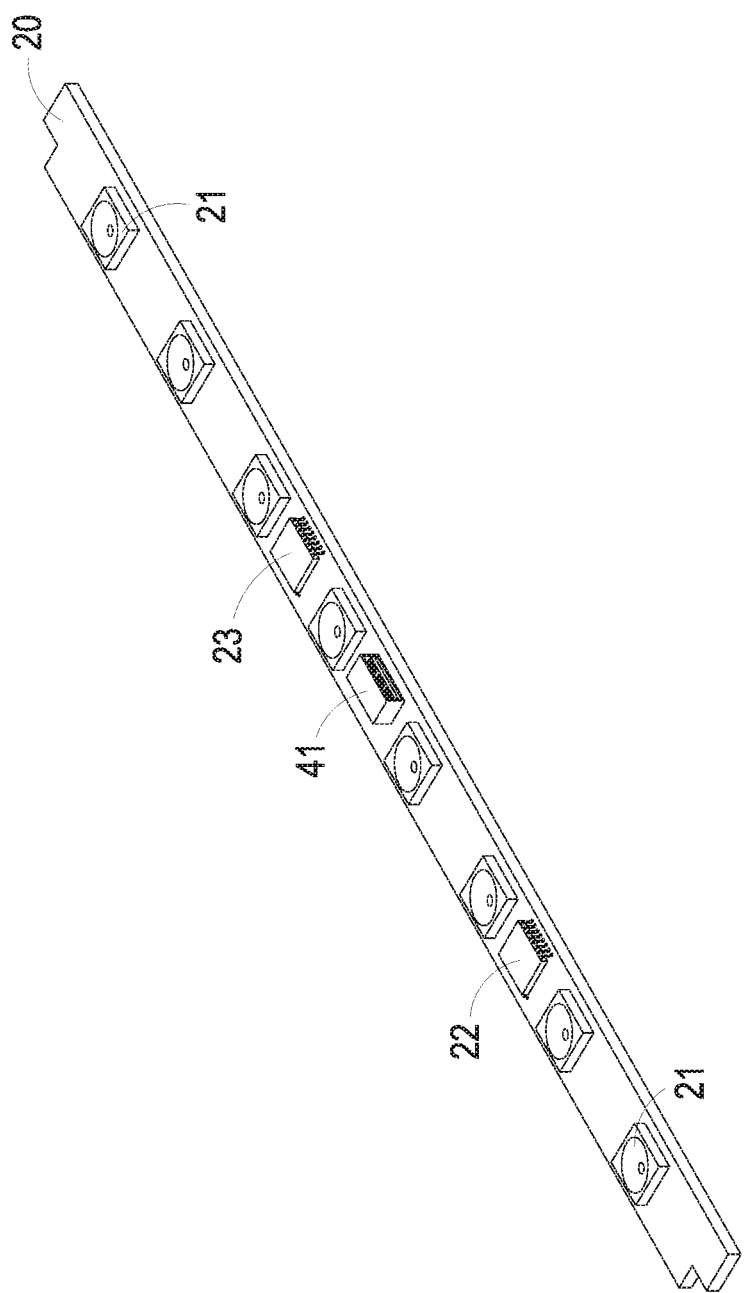
FIG. 2 schematically illustrates the light-emitting board of the light-emitting device according to the embodiment of the present invention.
Figure 3:
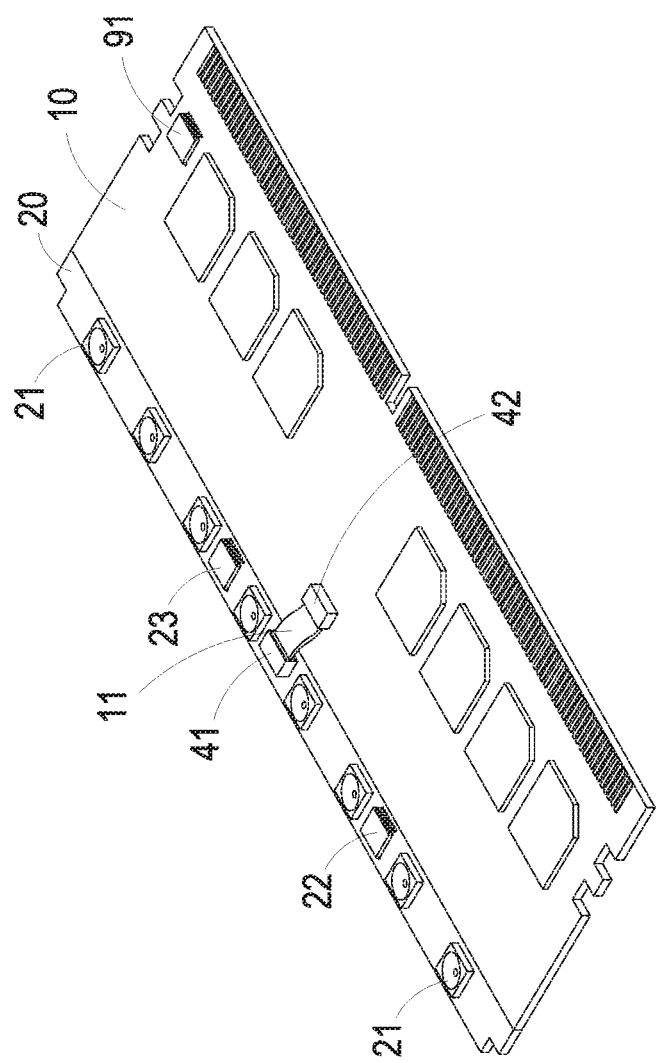
FIG. 3 schematically illustrates the combination of the memory module board and the light-emitting board of the light-emitting device according to the embodiment of the present invention.

FIG. 2 schematically illustrates the light-emitting board of the light-emitting device according to the embodiment of the present invention. FIG. 3 schematically illustrates the combination of the memory module board and the light-emitting board of the light-emitting device according to the embodiment of the present invention. Please refer to FIGS. 1, 2 and 3. In this embodiment, the light-emitting board 20 is a printed circuit board (PCB), and the light-emitting units 21 are light-emitting diodes (LED). Moreover, a LED controller 23 is further disposed on the light-emitting board 20. In response to a command from the control unit 22, the LED controller 23 controls the corresponding light-emitting unit 21 to emit the flickering light.

In this embodiment, the light-emitting board 20 comprises an insertion hole 41, and the memory module board 10 comprises an insertion hole 42. The two ends of the cable 11 are respectively inserted into the insertion holes 41 and 42. Consequently, the memory module board 10 and the control unit 22 are connected with each other through the cable 11. Moreover, the light-emitting board 20 and the memory module board 10 are fixed together or adhered together.

Due to the above arrangement, the control signal 31 is directly transmitted from the host 90 to the control unit 22 and not transmitted through the controller 91 of the memory module board 10. Consequently, while the controller 91 of the memory module board 10 accesses the dies of the memory module board 10, the accessing efficiency is not influenced by the control signal 31.

Figure 4:
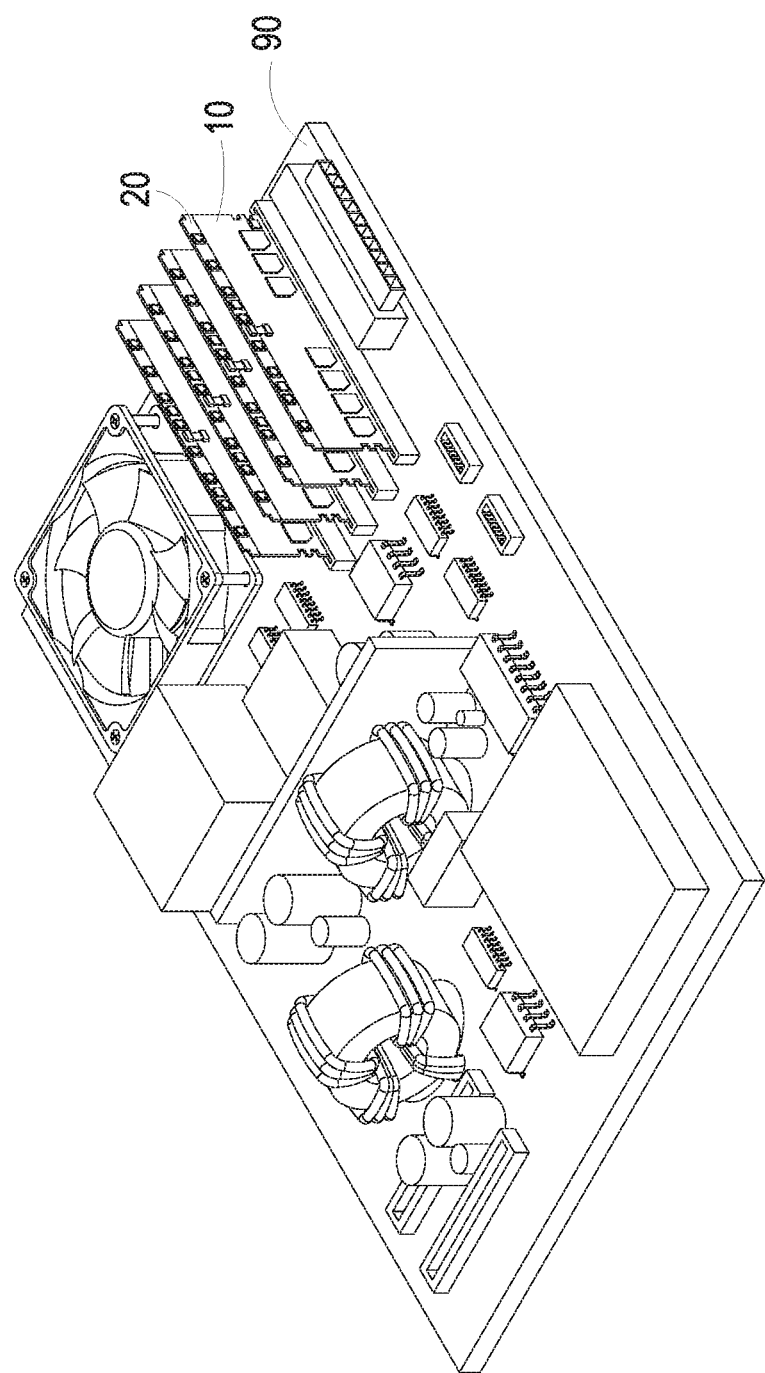
FIG. 4 schematically illustrates an implementation example of the light-emitting device according to the embodiment of the present invention.

FIG. 4 schematically illustrates an implementation example of the light-emitting device according to the embodiment of the present invention. Please refer to FIGS. 1 and 4. In this embodiment, the light-emitting device comprises four memory module boards 10 and the corresponding light-emitting boards 20. After the four memory module boards 10 are inserted into the corresponding memory module slots of the host 90, the application program unit 30 issues a control signal 31 to control the light-emitting units 21 of the corresponding light-emitting boards 20.

Moreover, the control signal 31 can control the lighting patterns of the light-emitting units 21 of the corresponding light-emitting boards 20. For example, the light-emitting units 21 of the light-emitting boards 20 in the four memory module slots are alternately enabled to emit the flickering light according to the control signal 31. Alternatively, in another embodiment, the light-emitting units 21 of the light-emitting boards 20 in the first and third memory module slots are alternately enabled to emit the flickering light according to the control signal 31.

More preferably, the application program unit 30 can be executed to detect a loading condition of the host 90. The loading condition includes a data flow of the memory module. Moreover, the application program unit 30 can be executed to detect the state of a specified component of the host 90. For example, the application program unit 30 can detect whether the CPU of the host 90 is in an idle state or a busy state or detect whether the space of the hard disk of the host 90 is insufficient. Each state of the specified component is related to a corresponding lighting mode data. The lighting mode data corresponding to different states are previously defined in the control unit 22. When the application program unit 30 issues a specified control signal 31 to the control unit 22, the control unit 22 selects the lighting mode data corresponding to the specified control signal 31 and controls the corresponding light-emitting units 21 according to the selected light mode data.

Figure 5:
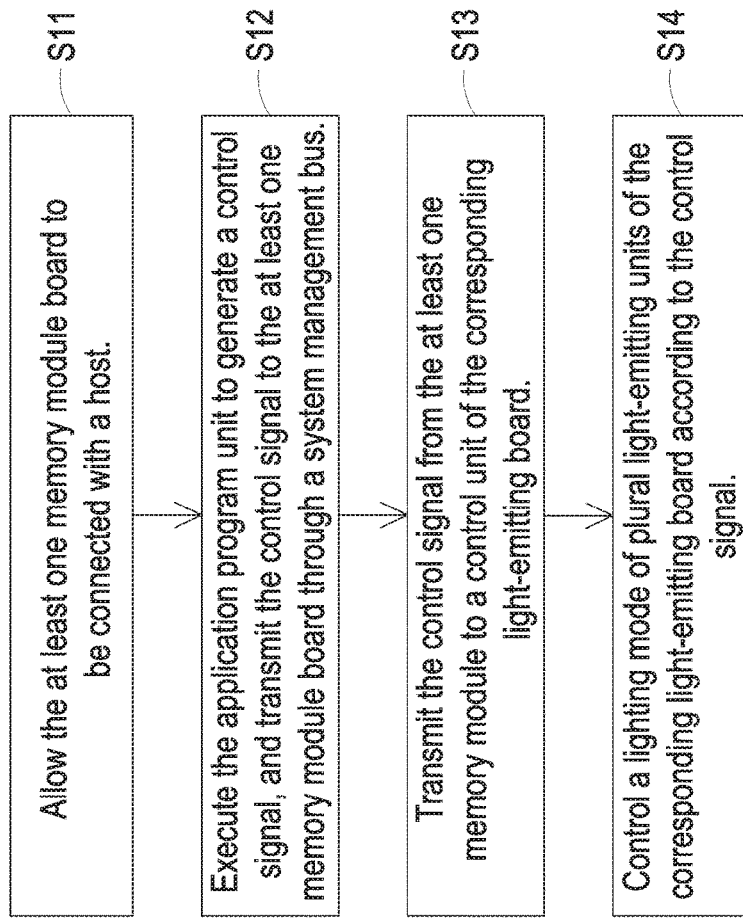
FIG. 5 is a flowchart illustrating a control method according to an embodiment of the present invention.

FIG. 5 is a flowchart illustrating a control method according to an embodiment of the present invention. The control method is applied to a light-emitting device. The light-emitting device includes at least one memory module board, at least one light-emitting board and an application program unit. The at least one light-emitting board is fixed on the corresponding memory module board. The control method includes the following steps.

In a step S11, the at least one memory module board is electrically connected with a host. For example, the host is a motherboard of a computer system. In an embodiment, when a gold finger of the memory module board is inserted into the corresponding memory module slot of the host, the memory module board is electrically connected with the host.

In a step S12, the application program unit generates a control signal, and the control signal is transmitted to the at least one memory module board through a system management bus. In an embodiment, the application program unit is installed in a hard disk that is connected with the host. When the application program is executed, the control signal is generated. The way of generating the control signal has been mentioned as above.

In a step S13, the control signal is transmitted from the at least one memory module to a control unit of the corresponding light-emitting board. For example, the control unit is a microcontroller unit, and the light-emitting units are light-emitting diodes. Moreover, each memory module board is connected with the corresponding control unit through a cable, and the memory module board transmits electric power to the corresponding control unit and the corresponding light-emitting units and transmits the control signal to the corresponding control unit through the cable.

In a step S14, a lighting mode of plural light-emitting units of the corresponding light-emitting board is controlled according to the control signal.

Moreover, the control method further comprises a step of determining the lighting mode of the corresponding light-emitting unit according to the control signal. The way of determining the lighting mode of the corresponding light-emitting unit according to the control signal has been mentioned as above.

In an embodiment, the control method further comprises the following steps. Firstly, the control signal is generated according to a result of detecting a data flow of the memory module. Then, the plural light-emitting units are controlled according to the control signal, so that the lighting mode corresponding to the data flow of the memory module is displayed. Moreover, the control signal can indicate the state of a specified component of the host. Consequently, in addition to the memory module, the states of other computer components such as the hard disk or CPU can be displayed through the lighting modes of the light-emitting units.

From the above descriptions, the present invention provides a light-emitting device and a control method. In accordance with the conventional technologies, a hardware component is used to emit the light beam in the monotonous lighting mode, or a software method is used to control the light-emitting units in multiplexing manner through a controller of the memory module. The present invention can overcome the drawbacks of the conventional technologies. Consequently, the light-emitting units have diverse lighting modes, and the accessing efficiency of the controller of the memory module is enhanced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A light-emitting device for a memory module, the light-emitting device comprising:
    at least one memory module board connected with a host;
    at least one light-emitting board, wherein the light-emitting board comprises plural light-emitting units and a control unit, wherein the control unit controls a lighting mode of the plural light-emitting units, and the control unit is electrically connected with the host through the corresponding memory module board; and
    an application program unit generating a control signal, wherein the control signal is generated according to a result of detecting a data flow of the memory module and is transmitted to the control unit of the light-emitting board through the host, and the control unit controls the corresponding light-emitting units according to the control signal, thereby displaying the lighting mode corresponding to the data flow of the memory module.

2. The light-emitting device according to claim 1, wherein the memory module board is connected with the corresponding control unit through a cable, and the memory module board transmits electric power to the corresponding control unit and the corresponding light-emitting units and transmits the control signal to the corresponding control unit through the cable.

3. The light-emitting device according to claim 1, wherein the control unit is a microcontroller unit, and the light-emitting units are light-emitting diodes.

4. The light-emitting device according to claim 1, wherein the light-emitting board is fixed on the corresponding memory module board.

5. A control method for a light-emitting device, the light-emitting device being applied to a memory module, the light-emitting device comprising at least one memory module board, at least one light-emitting board and an application program unit, the at least one light-emitting board being fixed on the corresponding memory module board; the control method comprising steps of:
    allowing the at least one memory module board to be connected with a host;
    executing the application program unit to generate a control signal, and transmitting the control signal to the at least one memory module board through a system management bus, wherein the control signal is generated according to a result of detecting a data flow of the memory module;
    transmitting the control signal from the at least one memory module to a control unit of the corresponding light-emitting board, thereby displaying the lighting mode corresponding to the data flow of the memory module; and
    controlling a lighting mode of plural light-emitting units of the corresponding light-emitting board according to the control signal.

6. The control method according to claim 5, wherein the memory module board is connected with the corresponding control unit through a cable, and the memory module board transmits electric power to the corresponding control unit and the corresponding light-emitting units and transmits the control signal to the corresponding control unit through the cable.

7. The control method according to claim 5, wherein the control unit is a microcontroller unit, and the light-emitting units are light-emitting diodes.

* * * * *